Sept. 23, 1947.  J. T. LEONARD  2,427,680
LUBRICANT MEASURING VALVE
Filed May 27, 1944  4 Sheets-Sheet 1
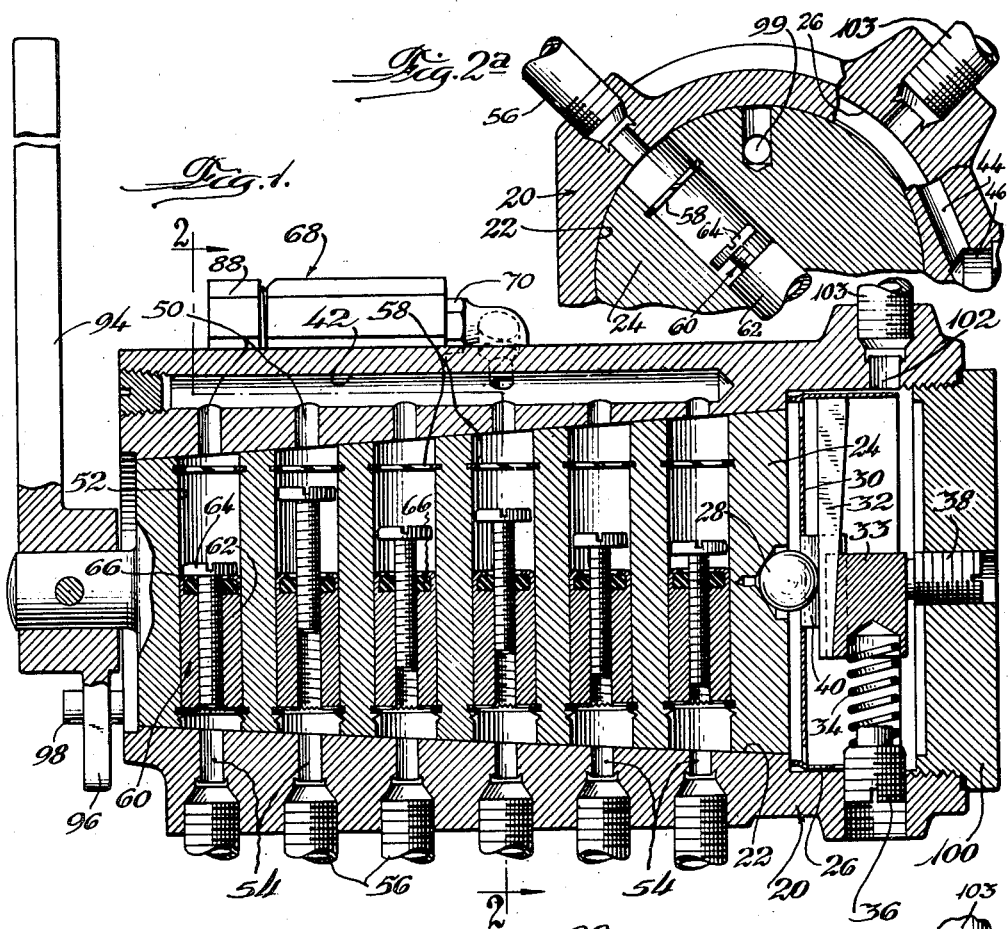
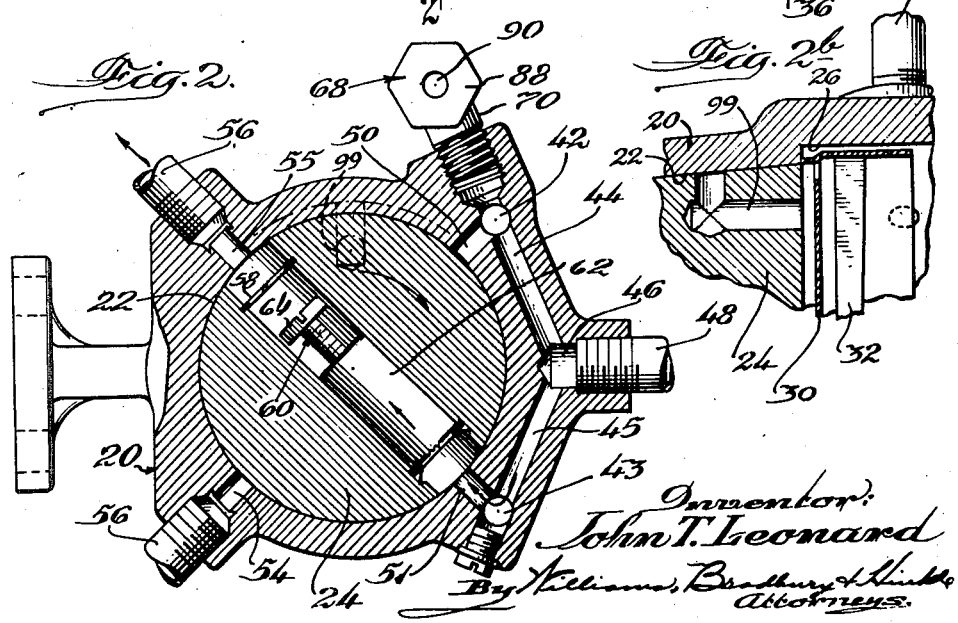

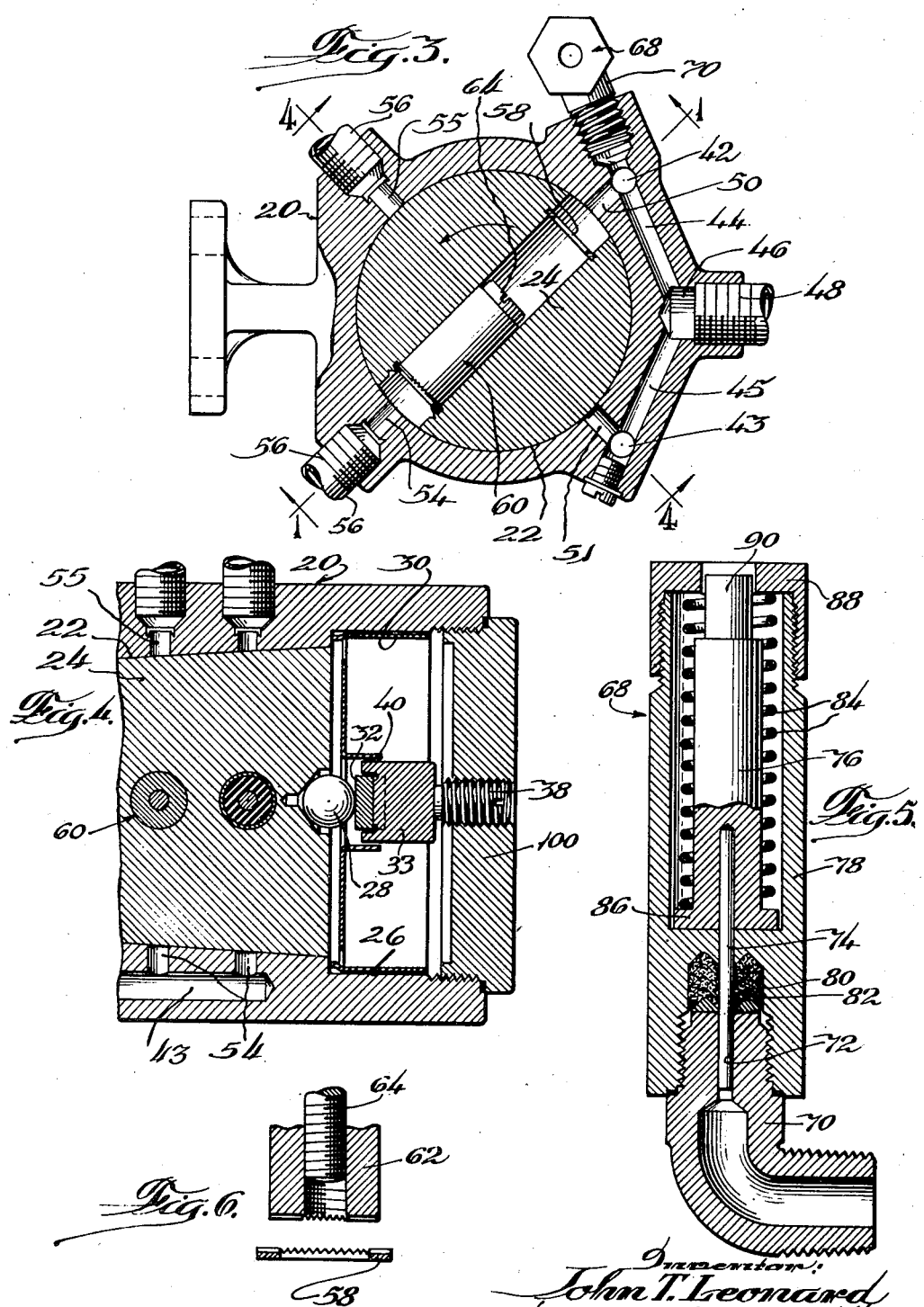

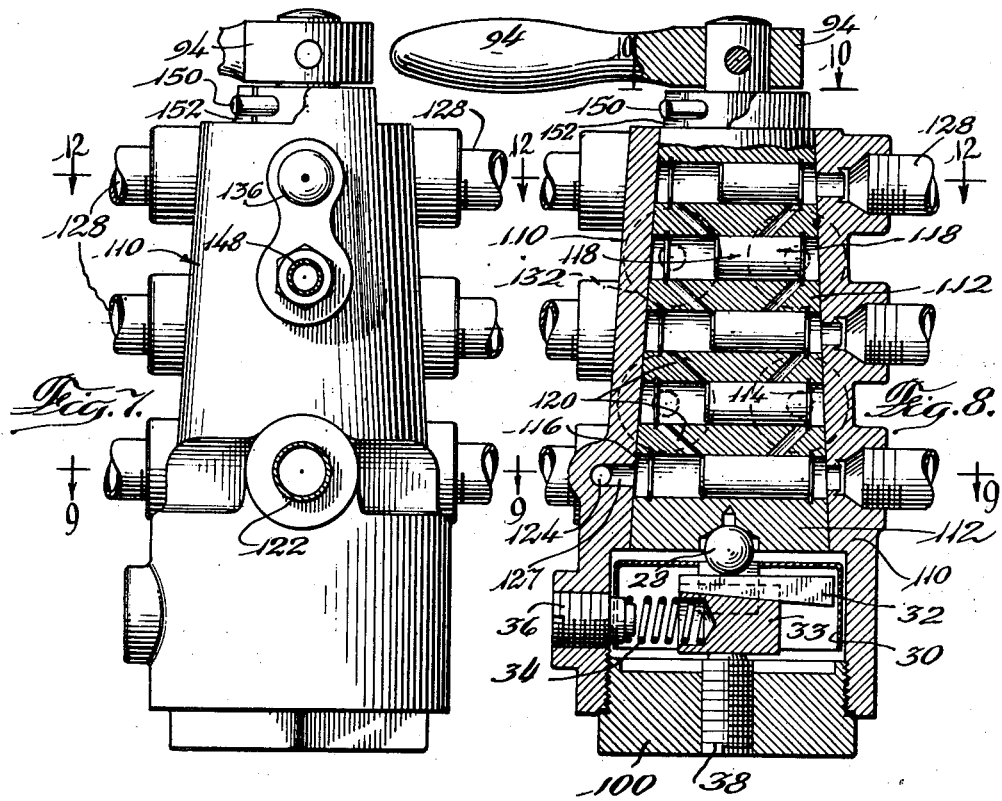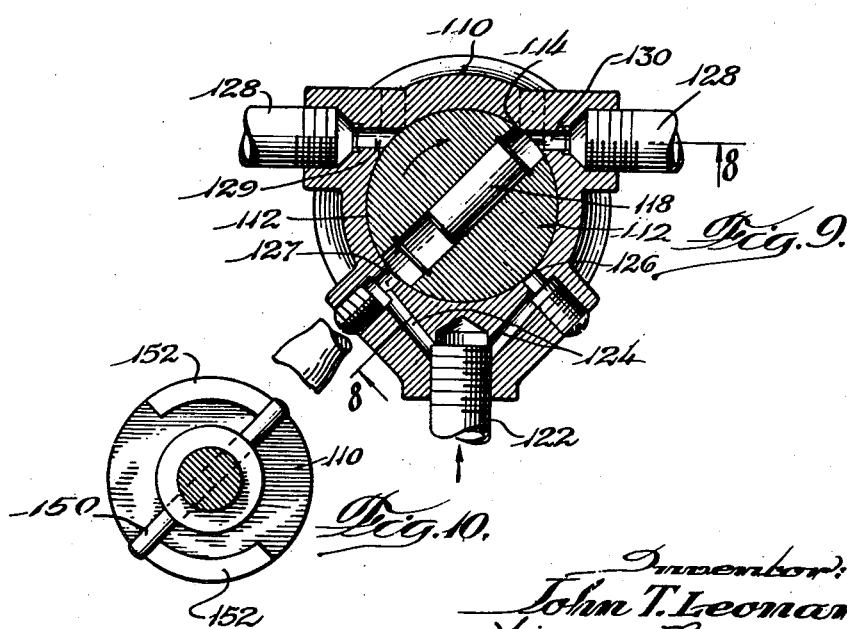

Sept. 23, 1947. J. T. LEONARD 2,427,680
LUBRICANT MEASURING VALVE
Filed May 27, 1944 4 Sheets-Sheet 4
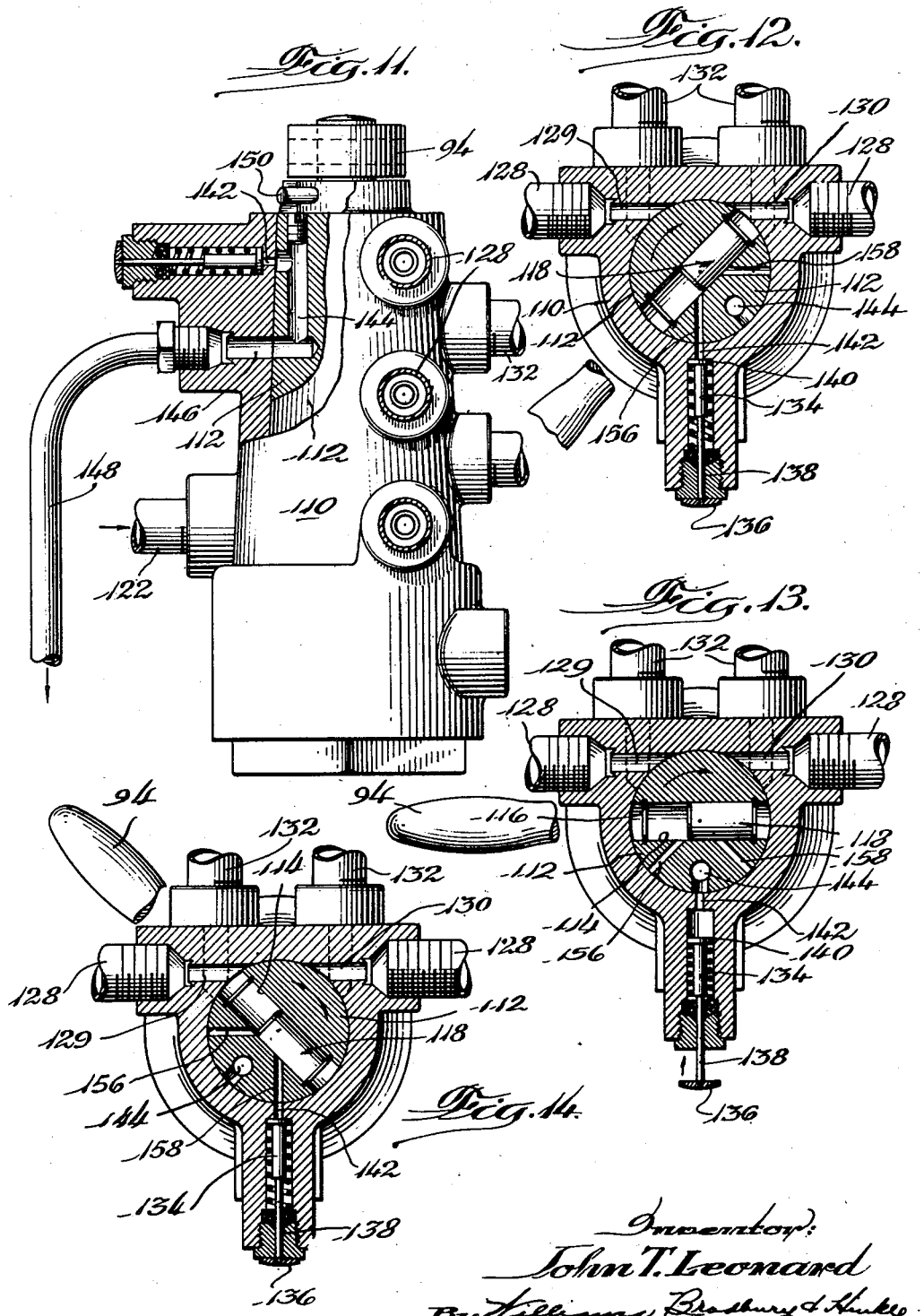
Inventor:
John T. Leonard
By Williams, Bradbury & Hinkle
Attorneys.

Patented Sept. 23, 1947

2,427,680

UNITED STATES PATENT OFFICE 2,427,680

LUBRICANT MEASURING VALVE

John T. Leonard, Evanston, Ill.

Application May 27, 1944, Serial No. 537,720

7 Claims. (Cl. 184—7)

My invention relates generally to centralized lubricating systems, and more particularly to improved means for dividing the lubricant supply into a plurality of measured charges individual to the several bearings to be lubricated.

It is an object of my invention to provide a simple multiple-unit lubricant measuring apparatus which is capable of controlling the supply of individually measured charges of lubricant to a plurality of bearings by means of a single manual operation.

A further object is to provide an improved lubricant distributing valve.

A further object is to provide an improved plug valve mechanism incorporating a plurality of lubricant measuring devices.

Other objects will appear from the following description, reference being had to the accompanying drawings, in which Fig. 1 is a central longitudinal sectional view of a multiple unit measuring valve, taken on the line 1—1 of Fig. 3;

Fig. 2 is a transverse sectional view taken on the line 2—2 of Fig. 1;

Figs. 2a and 2b are fragmentary sectional views showing the passageway for relieving the pressure in the indicator;

Fig. 3 is a view similar to Fig. 2, showing the valve plug in displaced position;

Fig. 4 is a fragmentary sectional view taken on the line 4—4 of Fig. 3;

Fig. 5 is a longitudinal sectional view of an improved pressure indicator forming part of the apparatus;

Fig. 6 is a fragmentary sectional view, to an enlarged scale, showing the serrated piston and end stop ring;

Fig. 7 is a side elevational view of a modified form of the invention;

Fig. 8 is a longitudinal sectional view taken on the line 8—8 of Fig. 9;

Fig. 9 is a transverse sectional view taken on the line 9—9 of Fig. 7;

Fig. 10 is a transverse sectional view taken on the line 10—10 of Fig. 8;

Fig. 11 is a side elevational view, partly in section, showing the connections to the indicator;

Fig. 12 is a transverse sectional view taken on the line 12—12 of Fig. 8; and

Figs. 13 and 14 are views similar to Fig. 12, showing the valve plug in its opposite and intermediate positions, respectively.

The form of the invention shown in Figs. 7 to 14 is claimed specifically in divisional application Serial No. 757,156, filed June 26, 1947.

As shown in Figs. 1 to 6, inclusive, the distributing valve of my invention comprises a body 20 having a tapered bore 22 to receive a complementally shaped plug 24. The plug 24 is snugly held in position so as to have its tapered outer surface in lubricant sealing contact with the bore 22 by a mechanism contained in a counterbore 26 formed at the end of the body 20. The end of the plug 24 has a central recess to receive a ball bearing 28. Within a suitable cage 30 there is provided a pair of wedge blocks 32, 33 which, as best shown in Fig. 4, are held against relative lateral displacement, the wedge block 33 having a recess for receiving one end of a compression coil spring 34, the other end of the spring fitting over the end of a set screw 36 which is adjustably threaded in the body 20.

The outer surface of the wedge block 33 is in contact with the end of an adjustable set screw 38. The cooperating surfaces of the wedge blocks 32 and 33 are at a small angle, in the order of three or four degrees, and the wedge blocks are guided in their engaging position by flanges 40 struck from the end wall of the cage 30. It will be apparent that as wear takes place between the plug 24 and its bore 22, the wedge block 33 will be forced radially inwardly by the spring 34, and thus, by its cooperative action with the wedge block 32, take up any slack produced. The wedge block 32 presses against the ball 28, providing the minimum of friction between the plug 24 and the wedge block 32.

Due to the small angle of inclination of the cooperating surfaces of the wedge blocks 32 and 33, the slack take-up constitutes a nonreversible kinematic train, which at all times applies a sufficient force in the axial direction of the plug 24 to maintain the latter seated against the walls of the bore 22. The plug 24 thus continues, during its operation, to lap itself more smoothly in its seating surface.

The valve body is provided with a pair of longitudinal bores 42, 43, which are connected by means of passageways 44, 45 with the inlet 46, the latter being connected by a pipe 48 to a suitable source of lubricant under pressure. Branching from the bores 42, 43, are a plurality of inlet ports 50, 51 intersecting the bore 22.

The plug 24 is provided with a plurality of measuring cylinders 52, the ends of which are adapted to register with either the inlet ports 50 or the inlet ports 51, respectively, and the opposite ends of which are adapted to register with outlet ports 54, or 55. Pipes 56 leading to the bearings or other parts to be lubricated, are connected to the body 20 so as to be in communication respectively with the outlets 54, 55.

Within each of the cylinders are two spaced annular stop rings 58 which may be in the form of split rings fitting in suitable annular grooves formed in the walls of the cylinders 52 and projecting into the cylindrical space sufficiently to provide limit stops for pistons 60, which are freely reciprocal in the cylinders 52. Each of these pistons 60 comprises a body 62 which is longitudinally bored and threaded to receive an adjusting cap screw 64. An elastic washer 66 is secured at one end of the piston body 62, so as to engage with the threads of the cap screw 64 and hold the latter in adjusted position.

The lower end (Fig. 1) of the body 62 is serrated, as best shown in Fig. 6, and the cooperating surface of the split ring 58 adjacent thereto is complementally serrated. These serrations are provided so that the screws 64 may be rotated while the body 62 is held against rotation by the cooperation of the serrations thereon with the serrations of the stop ring 58. To prevent the serrated rings 58 from rotating they may be peened in their grooves. The heads of the screws 64 are of sufficient diameter to engage the stop rings 58 and thus arrest the movement of the pistons in one direction. This adjustment may be effected readily without removing the valve plug 24 from the body 20. The conduits 56 associated with the pistons to be adjusted are disconnected from the body whereupon the cap screws 60 may be turned by a screw driver inserted through ports 54 or 55.

It will thus be apparent that by adjustment of the cap screw 64 with reference to the piston body 62, the length of the piston stroke, and hence the quantity of lubricant discharged upon each stroke thereof, may be readily predetermined. In Fig. 1, the various pistons are shown as having their cap screws adjusted for different lengths of stroke.

A pressure indicator 68 is secured to the body 20 in communication with the bore 42 (Figs. 2 and 3), this indicator being shown in section in Fig. 5 as comprising an elbow 70 having a small bore 72 in one leg thereof, this bore receiving a plunger 74 which projects into a hole drilled axially in the end of a guide and indicator member 76. The latter member and plunger are carried in a sleeve 78 threaded to the elbow 70 and having a recess 80 for the reception of a suitable packing 82.

The plunger 74 is normally held in the position shown in Fig. 5 by a prestressed coil spring 84, which is compressed between a shoulder 86 formed on the member 76 and a cap 88 which is threaded over the end of the sleeve 78. The cap 88 is provided with an opening for a reduced diameter end portion 90 of indicator 76.

When the lubricant pressure applied to the elbow 70 exceeds a predetermined value, the plunger 72 will be moved outwardly against the force of the spring 84, and thus cause the reduced diameter end portion to project from the cap 88 to provide a visual and tactile signal showing that the pressure has exceeded a predetermined value, indicative of the fact that the lubricating operation, or one phase thereof, has been completed.

The end of the plug 24 has a handle 94 pinned thereto, the handle having an extension 96 engageable with suitable stop lugs 98, which limit the angular displacement of the valve plug 24 to 90°.

The plug 24 is provided with an elbow shaped passageway 99 (Figs. 2a and 2b) near its larger diameter end, this passageway being adapted, as the plug 24 is rotated between its two operative positions, temporarily to connect the port 50 at the end of the passageway 42 to the space occupied by the slack takeup mechanism. This space is closed by the end cap 100 and has an outlet port 102 which is connected to a bearing by a conduit 103. Thus the pressure in the passageway 42 is relieved each time the plug 24 is rotated and the spring 84 expands to cause its plunger to eject lubricant which may flow through the passageways 42 and 99 into the space closed by the cap 100, from which the lubricant flows through port 102 and conduit 103 to a part to be lubricated.

Assuming that the parts are in the position shown in Figs. 1 and 3, the operator will shift the plug 24 counterclockwise to the position in which the plug is shown in Fig. 2, whereupon lubricant under pressure entering the ends of the cylinders 52 through the ports 51, will force the pistons 60 upwardly and to the left from the position in which the piston is shown in Fig. 2, thereby discharging the lubricant ahead of the pistons 60 through the ports 55 and pipes 56 to the bearings to be lubricated. The fact that such bearings have received their charge of lubricant will be indicated by the indicator shown in Fig. 5, since as soon as all of the pistons have moved to their home position in which they are arrested by their stop split rings 58, the pressure within the inlet bores 42 and 43 will build up and force the indicator plunger 74 outwardly against the force of the spring 84, and thereby cause the end portion 90 of the indicator member 76 to project from the cap 88. The operator may conveniently hold his finger over the end of the cap 88 and note the completion of the operation of the measuring valves by noting the projection of the plunger by his sense of touch.

After the valve plug 24 has been moved to the position of Fig. 2, and all of the bearings connected to the outlet ports 55 have been supplied with lubricant, the operator will return the valve plug to the position in which it is shown in Fig. 3, whereupon lubricant entering the ports 50 will flow into the cylinders 52 and force the pistons 60 to the position in which the piston is shown in Fig. 3, thus discharging the lubricant ahead of the piston through the ports 54 and pipes 56 to the other bearings to be lubricated.

Since the strokes of the piston 60 may be predetermined by adjustment of the cap screws 64, pairs of bearings requiring substantially equal quantities of lubricant will be connected to corresponding pairs of the outlet ports 54, 55. Thus, the system is capable of arrangement such that different bearings may be supplied with different quantities of lubricant, dependent upon their respective requirements.

The lubricating operation is very simple since, assuming that lubricant under pressure is being supplied through the inlet pipe 48, the operator need merely shift the valve body 24 in one direction through an angle of 90° and hold it in such position until the indicator shows completion of this phase of the lubricating operation, whereupon the operator will swing the valve plug 90° in the opposite direction to cause the lubricant to be supplied to the remaining bearings. Hence it is seen that the valve body may be moved between two positions such, for example, as position A and position B. In this way a plurality of bearings, twelve in the embodiment shown, may be substantially simultaneously lubricated by a simple operation.

In the modified form of the invention shown in Figs. 7 to 14, the valve body 100 and tapered valve plug 112 are generally similar to the valve body and plug of the previously described embodiment. The parts thereof which correspond to those previously described have therefore had corresponding reference characters applied thereto, and will not again be described.

In this embodiment of the invention, there are five cylinders 114 formed in the plug 112, these cylinders being provided with split stop rings 116 similar to those previously described, although in those embodied in this invention there is no reason for having one of these rings serrated. Within each of the cylinders 114 is a solid piston 118, these pistons being of different lengths to compensate for the different lengths of the cylinders in which they operate, and to secure uniform volumetric discharge therefrom. The cylinders 114 are connected in series by a plurality of diagonal ducts 120.

Lubricant is supplied through a pipe 122 (Fig. 8) which connects with pairs of ducts 124 terminating in inlet ports 126, 127. There are provided six outlet pipes 128 leading laterally from the body 110 to bearings to be lubricated, these pipes communicating with outlet ports 129, 130, while there are four pipes 132 leading from the rear side of the body 110 to bearings, these pipes 132 communicating with ports similar to the ports 129 and 130, as indicated by the dotted lines in Fig. 13.

A pressure indicator 134 is provided with an indicator button 136 secured to a spring-pressed plunger 138 having a piston 140 at the other end thereof. This piston is subjected to lubricant pressure supplied through a port 142. The plug 112, as best shown in Fig 11, is provided with a passageway 144, one end of which is adapted, under certain conditions, to register with the port 142, while the other end registers with an exhaust port 146, which a pipe 148 connects to a part to be lubricated. The plug 112 has a stop pin 150 projecting therethrough, the ends of this pin being adapted to engage arcuate lugs 152 formed on the body 110 so as to limit the angular movement of the plug 112 to 90°.

In operation, when lubricant is supplied through the conduit 122 and the valve plug 112 is in the position shown in Fig. 9, lubricant will be supplied through the inlet port 127 to the lowermost cylinder 114 and force the piston 118 therein to the position in which it is shown in Fig. 9, such movement of the piston 118 forcing a measured quantity of lubricant from the opposite end thereof through the associated port 130 and pipe 128 to the bearing. When the lowermost piston has moved a sufficient distance to uncover the end of the passageway 120 (Fig. 8) which is nearest the inlet port 127, lubricant flows through this passageway into the second lowermost cylinder 114 and moves the piston 118 therein in a similar manner. The remaining pistons 118 are thereafter progressively moved to the positions in which they are shown in Fig. 8, thereby discharging the lubricant therefrom to their associated bearings.

When the uppermost piston 118 has thus been moved, lubricant flows from the pressure end of its cylinder through a passageway 156 to the inlet port 142 of the indicator, forcing the plunger 138 thereof outwardly to provide a visible and tactile signal to show that all of the pistons have been operated. When this occurs, the operator, by means of the handle 94, turns the valve plug 112 clockwise from the position in which it is shown in Figs. 9 and 12, to the position in which it is shown in Fig. 14. In the course of such movement, the passageway 144 registers with the indicator port 142, as shown in Fig. 13, thereby permitting the spring-pressed plunger 138 to move inwardly and discharge lubricant contained in the plunger cylinder through the passageway 144 to the outlet port 146, the indicator thus returning to normal position.

When the plug has been moved to the position in which it is shown in Fig. 14, the opposite end of the lowermost cylinder 114 is brought into registry with the inlet port 126 and lubricant is thus supplied to the lowermost cylinder 114, forcing the plunger in the opposite direction and discharging the lubricant ahead of the piston to the outlet port 129 associated therewith, and hence to the bearing. Upon movement of the piston 118 sufficiently to uncover the end of the passageway 120 on the pressure side of the piston, lubricant flows from the lowermost cylinder 114 to the next adjacent cylinder, and operates the piston therein in a similar manner. The remaining pistons are progressively operated in succession until the uppermost piston 118 has been moved to discharge lubricant through its associated port 129 to the bearing. When this uppermost piston 118 has moved from the position in which it is shown in Fig. 14 to fully discharge the lubricant ahead of it, the piston will uncover the end of a passageway 158 which at this time is in communication with the port 142 of the indicator, and thus will apply pressure to the plunger of the latter and move it outwardly, and thereby indicate to the operator that the lubrication operation has been completed.

While I have shown and described particular embodiments of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. A lubricating device for supplying measured charges of lubricant to a multiplicity of bearings comprising, a body having a tapering bore therein, a plug having a complementally tapered external surface and fitting in said bore for rotation with respect to said body, said body having two series of longitudinally aligned inlet ports and two series of outlet ports, each outlet port being located diametrically opposite one of said inlet ports, said plug having a plurality of cylindrical measuring bores extending diametrically therethrough and respectively alignable each with one of said inlet ports and one of said outlet ports, a plurality of pistons reciprocable in said cylindrical bores, means in said bores for limiting the extent of movement of said pistons, and manually operable means for rotating said plug so as alternately to bring the opposite ends of said cylindrical measuring bores into alignment with each series of inlet ports and to bring the opposite ends of said cylindrical measuring bores into alignment with the opposite series of said outlet ports.

2. A centralized lubricating device comprising, a valve body having a valve plug rotatable with respect thereto, means forming a passageway for conducting lubricant under pressure into said valve body, two sets of aligned inlet ports in said body communicating with said passageway, two sets of longitudinally aligned outlet ports, each set being diametrically opposite a set of said inlet ports, a plurality of diametric bores extending through said valve plug, each bore being alignable with one of said inlet ports and its diametrically opposite outlet port, a free piston in each of said bores, and manually operable means for relatively rotating said plug in said body so as alternately to bring one end of each of said bores into alignment with said sets of inlet ports and to bring the opposite ends thereof into alignment with said sets of outlet ports, means in said bores forming stops to limit the extent of reciprocatory movement of said pistons, and adjustable means on said pistons for changing the effective lengths thereof and thereby to adjust them for strokes of different lengths.

3. The combination set forth in claim 2, in which each of said bores is provided with a pair of spaced annular grooves, and in which said stops are in the form of split ring springs fitting in said grooves.

4. The combination set forth in claim 2, in which each of said pistons comprises a plunger portion having a sliding fit in its associated bore, has a resilient packing secured at one end thereof, and has a threaded hole therein, and in which said adjustable means comprises a screw threaded through said packing and into said hole, the screw having a head engageable with its associated stop.

5. A lubricating apparatus for supplying measured charges of lubricant to a multiplicity of bearings comprising, a body having a tapering bore therein, a plug having a complementally tapered external surface and fitting in said bore for rotation with respect to said body, said body having two series of longitudinally aligned inlet ports and two series of outlet ports, each outlet port being located diametrically opposite one of said inlet ports, said plug having a plurality of cylindrical measuring bores extending diametrically therethrough and respectively alignable each with one of said inlet ports and one of said outlet ports, a plurality of pistons reciprocable in said cylindrical bores, means in said bores for limiting the extent of movement of said pistons, manually operable means for rotating said plug so as alternately to bring the opposite ends of said cylindrical measuring bores into alignment with each series of inlet ports and to bring the opposite ends of said cylindrical measuring bores into alignment with the opposite series of said outlet ports, a pressure responsive indicating element connected to said inlet ports, and means for relieving the lubricant pressure applied to said pressure indicator incidental to rotating said plug between said two series of inlet ports.

6. A centralized lubricating apparatus comprising, a valve body having a valve plug rotatable with respect thereto, two sets of aligned inlet ports in said body communicating with said lubricant supplying means, two sets of longitudinally aligned outlet ports, each set being diametrically opposite a set of said inlet ports, a plurality of diametric bores extending through said valve plug, each bore being alignable with one of said inlet ports and its diametrically opposite outlet port, a free piston in each of said bores, means to limit the extent of movement of said free pistons, manually operable means for relatively rotating said plug in said body so as alternately to bring one end of each of said bores into alignment with said sets of inlet ports and to bring the opposite ends thereof into alignment with said sets of outlet ports, a lubricant pressure responsive device connected to said two sets of inlet ports, a port in said valve plug positioned so as to register with one of said inlet ports during the course of the relative rotation of said plug and said body thereby to relieve the lubricant pressure in said device, means in said bores forming stops to limit the extent of reciprocatory movement of said pistons, and adjustable means on said pistons for changing the effective lengths thereof and thereby to adjust them for strokes of different lengths.

7. In a lubricating device, the combination of a valve body having a plug rotatable therein between positions A and B, a plurality of series of inlet ports in said body, a plurality of outlet ports located respectively diametrically opposite said inlet ports, said plug having a series of cylindrical bores therein respectively registrable when in position A with one series of said inlet ports and one series of said outlet ports and registrable when in position B with a different series of inlet ports and a different series of outlet ports, pistons reciprocable in said bores respectively, means for limiting the strokes of said pistons, means for supplying lubricant under pressure to said inlet ports thereby to cause said pistons to move toward their respective outlet ports and thereby discharge lubricant from their respective cylinders, and a pressure responsive indicating device connected to said inlet ports and operable to indicate the building up of lubricant pressure at said inlet ports after said pistons have been moved to the ends of their strokes, a passageway in said plug leading to a space of relatively low lubricant pressure, said passageway being brought into registration with one of said inlet ports as said valve plug is moved between position A and position B.

JOHN T. LEONARD.

REFERENCES CITED

The following references are of record in the file of this patent:

UNITED STATES PATENTS

| Number | Name | Date |
| --- | --- | --- |
| 1,805,609 | Wilson | May 19, 1931 |
| 2,208,845 | Hillis | July 23, 1940 |
| 1,958,187 | Dirkes | May 8, 1934 |
| 2,254,341 | Zaikowsky | Sept. 2, 1941 |

FOREIGN PATENTS

| Number | Country | Date |
| --- | --- | --- |
| 741,283 | France | Dec. 3, 1932 |